Patented Mar. 2, 1948

2,436,825

UNITED STATES PATENT OFFICE 2,436,825

SUPEROPAQUE ENAMEL

Harold D. Prior, Plainfield, N. J., assignor to The Titanium Alloy Manufacturing Company, New York, N. Y., a corporation of Maine No Drawing. Application May 24, 1946, Serial No. 672,164

3 Claims. (Cl. 106—48)

The present invention relates to zirconium opacified enamels and particularly to a class of such enamels designated as superopaque and which are also classed as acid resisting enamels. More particularly, the invention relates to superopaque enamels of the zirconium type which contain a relatively large proportion of lithium oxide and phosphorous pentoxide.

Although the opacifying characteristics of zirconium dioxide have been known for a considerable period of time, it is only within recent years that zirconia has received any great acceptance as an opacifier for vitreous enamel coatings. Zirconium compounds when used as opacifiers impart opaquing qualities either by reason of the fact that they are opaque in the frit, precipitate as opacifying materials during the enameling cycle, or act in both ways. The more recent developments in the employment of zirconium compounds as opacifiers indicate that a very high degree of opacification can be obtained by retaining the zirconium compound in solution in the frit producing either a clear or translucent frit, from which the zirconium compound precipitates or crystallizes during the enameling cycle thus imparting the desirable property of opaqueness in the finished enamel.

The diffuse reflectance or opacity of the enamel is generally measured upon a standard instrument such as the Hunter reflectometer, and enamels giving a diffuse reflectance reading of greater than 65 at an application rate of 40 grams per square foot are said to be superopaque; it is in this class of enamels that the present invention falls.

Although the superopaque enamels of the zirconium type and in which the opacity is developed by precipitation or crystallization of the opacifier in the enameling cycle possess a high diffuse reflectance and are therefore highly desirable for their covering power at low application rates, they possess the disadvantage that they are not particularly resistant to the etching action of fruit acids. The resistance to fruit acids is generally determined empirically by observing the resistance to attack by dilute citric acid, for instance a 10% solution. Generally speaking, an enamel is considered to possess good acid resisting properties if no loss in gloss is noticed after 15 minutes contact with 10% citric acid at room temperature.

It is an object of the present invention to provide a superopaque enamel composition of the zirconium type which is resistant to the action of fruit acids.

In accordance with the present invention a frit composition is prepared containing lithium oxide and phosphorous pentoxide in addition to the usual constituents found in zirconium opacified enamel composition of the type which develops opacity in the enameling cycle. In general, the weight ratio of phosphorous pentoxide to alumina should not depart very greatly from unity. Furthermore, the lithium oxide content should be approximately equal to the fluorine content, while the $P_2O_5$ should be from about 4½ to 7 times the lithium oxide by weight. In general, the frit composition should possess an oxide composition within the following ranges set forth in Table I:

TABLE I

| | Per cent |
|---|---|
| $Na_2O$ | 3–6 |
| $K_2O$ | 1–5 |
| $Li_2O$ | 3–5 |
| $BaO$ | 1–3 |
| $CaO$ | 1–5 |
| $ZnO$ | 5–7 |
| $B_2O_3$ | 7–9 |
| $Al_2O_3$ | 20–25 |
| $P_2O_5$ | 22–25 |
| $SiO_2$ | 7–15 |
| $F_2$ | 3–5 |
| $ZrO_2$ | 6–10 |

The raw batch from which the frit is made is prepared from any of the usually employed ceramic materials such as feldspar, zircon, soda ash, alumina hydrate, zinc oxide, barium carbonate, silica, fluorspar, cryolite and the lithium oxide may be suitably finished by employing amblygonite. This natural mineral is a lithium aluminum fluophosphate which contains approximately 9% $Li_2O$, 48.7% $P_2O_5$, 34.0% $Al_2O_3$ and 6% $F_2$. It will be understood that the invention is not restricted to the use of amblygonite since either lithium, fluorine, aluminum or phosphorous containing materials could be used as a raw material source. However, amblygonite is preferred since it offers both an economical and effective method of introducing these elements as constituents of the frit and the final enamel.

Raw batches were prepared in accordance with the composition set forth in Table II below and charged into a smelting furnace at a smelting temperature of 2250° F. to 2450° F. and maintained for from 30 to 90 minutes or until the smelting operation was complete, whereupon the batch was removed and fritted in the usual way in water. It will be understood that the invention is not restricted to the specific compositions set forth in Table II as many variations in formulation are possible within the scope of the invention.

1-3% BaO, 1-5% CaO, 5-7% ZnO, 7-9% $B_2O_3$, 20-25% $Al_2O_3$, 22-25% $P_2O_5$, 7-15% $SiO_2$, 3-5% $F_2$ and 6-10% $ZrO_2$.

TABLE II

*Raw batches*

|   | Amblygonite | Milled Zircon | Deh. Borax | $K_2CO_3$ 1½$H_2O$ | Quartz | Alum. Hydrate | Zinc Oxide | Milled Limestone | Soda Nitre | Barium Carbonate | $ZrO_2$ Milled | Soda Ash | K. Spar |
|---|---|---|---|---|---|---|---|---|---|---|---|---|---|
| A | 44.55 | 9.25 | 11.09 | 6.05 | 7.58 | 5.90 | 6.01 | 7.15 | 2.42 | | | | |
| B | 42.67 | 13.27 | 10.63 | 1.92 | 4.17 | 9.57 | 5.76 | 6.83 | 2.34 | 2.85 | | | |
| C | 42.79 | | 10.66 | 5.80 | 10.39 | 9.62 | 5.77 | 6.86 | 2.34 | | 5.77 | | |
| D | 41.98 | | 10.46 | 5.69 | 10.19 | 11.33 | 5.66 | 6.73 | 2.30 | | 5.66 | | |
| E | 43.63 | | 10.87 | 5.92 | 10.58 | 5.89 | 5.89 | 6.99 | 2.38 | | 7.85 | | |
| F | 43.23 | | 10.77 | 1.95 | 10.50 | 9.72 | 5.83 | 6.93 | 2.36 | 2.88 | 5.83 | | |
| G | 47.03 | | 9.93 | 1.54 | 11.72 | 10.62 | 5.34 | 2.72 | 2.09 | 1.96 | 5.74 | 1.31 | |
| H | 43.10 | 11.92 | 10.74 | 5.84 | 6.29 | 9.69 | 5.82 | 6.60 | | | | | |
| I | 43.84 | 12.13 | 10.92 | 3.89 | | 6.92 | 5.91 | 7.03 | | | | | 9.86 |
| J | 45.33 | 12.58 | 10.64 | 1.58 | 2.45 | 10.20 | 5.72 | 4.37 | 2.24 | 2.10 | | 2.80 | |

The various enamel frit compositions corresponding to the above raw batches possess the following calculated oxide compositions as set forth in Table III:

TABLE III

*Calculated oxide compositions*

|   | $Na_2O$ | $K_2O$ | $Li_2O$ | BaO | CaO | ZnO | $Al_2O_3$ | $B_2O_3$ | $P_2O_5$ | $SiO_2$ | $F_2$ | $ZrO_2$ |
|---|---|---|---|---|---|---|---|---|---|---|---|---|
| A | 4.74 | 3.80 | 3.80 | | 4.41 | 6.63 | 20.79 | 8.46 | 23.79 | 13.88 | 3.16 | 6.64 |
| B | 4.55 | 1.21 | 3.63 | 2.44 | 4.22 | 6.34 | 22.72 | 8.11 | 22.67 | 11.57 | 3.02 | 9.52 |
| C | 4.61 | 3.69 | 3.68 | | 4.28 | 6.44 | 23.07 | 8.23 | 23.00 | 13.49 | 3.07 | 6.44 |
| D | 4.55 | 3.64 | 3.63 | | 4.22 | 6.35 | 24.14 | 8.11 | 22.69 | 13.30 | 3.02 | 6.35 |
| E | 4.64 | 3.71 | 3.71 | | 4.31 | 6.48 | 20.40 | 8.28 | 23.16 | 13.58 | 3.09 | 8.64 |
| F | 4.61 | 1.23 | 3.68 | 2.47 | 4.28 | 6.44 | 23.07 | 8.23 | 23.00 | 13.48 | 3.07 | 6.44 |
| G | 4.98 | 0.95 | 3.94 | 1.65 | 1.65 | 5.80 | 24.71 | 7.46 | 24.60 | 14.75 | 3.28 | 6.23 |
| H | 3.62 | 3.65 | 3.65 | | 4.06 | 6.37 | 22.85 | 8.14 | 22.78 | 13.34 | 3.04 | 8.50 |
| I | 3.85 | 3.50 | 3.64 | | 4.23 | 6.35 | 22.84 | 8.12 | 22.71 | 13.25 | 3.03 | 8.48 |
| J | 6.40 | 1.00 | 4.54 | 1.81 | 2.73 | 6.36 | 24.50 | 8.18 | 24.50 | 7.65 | 3.27 | 9.09 |

The enamel frits were milled in the usual type porcelain ball mill to a fineness of less than 200 mesh in the presence of a small amount of bentonite or montmorillonite clay, all in accordance with standard procedure, and were applied to ground coated sheet steel panels. The applications were made at 40 grams per square foot and the panels were fired at 1520° F. for 2½ minutes although the firing range of the enamels of the present invention are from 1400° F. to 1600° F.

The panels were then immersed in 10% citric acid for 15 minutes. All showed good acid resistance, all as set forth in Table IV.

TABLE IV

|   | Grams per Sq. Ft. | (Hunter) Reflectance | Acid Resistance | Remarks |
|---|---|---|---|---|
| A | 39.6 | 64.7 | V. sl. stain 15' | Good gloss and surface. |
| B | 40.2 | 61.9 | do | High Gloss, good surface. |
| C | 42.6 | 59.0 | V. V. sl. stain 15' | Gloss and surface good. |
| D | 39.0 | 58.1 | No stain 15' | Do. |
| E | 43.8 | 64.3 | Sl. stain 15' | Do. |
| F | 39.6 | 62.5 | V. V. Sl. Stain 15' | Do. |
| G | 40.0 | 61.0 | No stain 30' | High gloss, good surface. |
| H | 42.0 | 60.8 | Sl. loss gloss 15' | Do. |
| I | 39.6 | 59.3 | do | Do. |
| J | 39.6 | 61.2 | No stain 15' | Fair gloss and surface. |

What is claimed is:

1. A composition suitable for vitreous enamels comprising 3-6% $Na_2O$, 1-5% $K_2O$, 3-5% $Li_2O$, 1-3% BaO, 1-5% CaO, 5-7% ZnO, 7-9% $B_2O_3$, 20-25% $Al_2O_3$, 22-25% $P_2O_5$, 7-15% $SiO_2$, 3-5% $F_2$ and 6-10% $ZrO_2$.

2. A raw batch suitable for the preparation of vitreous enamel composition comprising the following materials expressed in parts by weight Amblygonite _____ 41.98–47.03
Milled zircon _____ 9.25–13.27
Dehydrated borax _____ 9.93–11.09
Potash _____ 1.54– 6.05
Quartz _____ 2.45–11.72
Aluminum hydrate _____ 5.90–11.33
Zinc oxide _____ 5.34– 6.01
Limestone _____ 2.72– 7.15
Soda nitre _____ 2.09– 2.38

3. A composition suitable for vitreous enamels comprising 3.62–6.40% $Na_2O$, 0.95–3.80% $K_2O$, 3.63–4.54% $Li_2O$, 1.65–4.41% CaO, 5.80–6.63% ZnO, 20.40–24.50% $Al_2O_3$, 7.46–8.46% $B_2O_3$, 22.67–24.50% $P_2O_5$, 7.65–13.88% $SiO_2$, 3.02–3.27% $F_2$ and 6.23–9.09% $ZrO_2$.

HAROLD D. PRIOR.